United States Patent [19]
Hart

[11] Patent Number: 4,684,836
[45] Date of Patent: Aug. 4, 1987

[54] MAGNETIC SPEED REDUCTION DEVICE

[75] Inventor: Edward E. Hart, Springfield, Ohio

[73] Assignee: Spectra-Physics, Inc., San Jose, Calif.

[21] Appl. No.: 881,458

[22] Filed: Jul. 2, 1986

[51] Int. Cl.$^4$ ............................ F16H 5/20; H02K 7/116
[52] U.S. Cl. ................................. 310/83; 74/DIG. 4;
310/156
[58] Field of Search .................... 310/46, 80, 83, 84,
310/104, 156, 162, 257, 266, 268

[56] References Cited

U.S. PATENT DOCUMENTS

| 3,382,386 | 5/1968 | Schlaeppl | 310/104 |
| 3,696,260 | 10/1972 | Lace | 310/156 |
| 4,315,171 | 2/1982 | Schaeffer | 310/49 R |
| 4,459,501 | 7/1984 | Fawzy | 310/156 |

FOREIGN PATENT DOCUMENTS

| 2250712 | 4/1974 | Fed. Rep. of Germany | 310/46 |
| 732601 | 5/1980 | U.S.S.R. | 74/DIG. 4 |

Primary Examiner—Peter S. Wong
Assistant Examiner—D. L. Rebsch
Attorney, Agent, or Firm—Killworth, Gottman, Hagan & Schaeff

[57] ABSTRACT

A magnetic speed device includes a rotatable driving shaft and a driven shaft also rotatable about an axis. A stationary pole includes a plurality of pole elements, each having at least one stationary pole surface. The pole elements are circumferentially arranged around the axis. A rotor is operatively coupled to the driven shaft for rotation with the driven shaft about the axis. The rotor includes a plurality of circumferentially arranged rotor pole surfaces. The number of rotor pole surfaces is different from the number of stationary pole surfaces. The rotor pole surfaces are disposed in a spaced, generally opposed relation to the stationary pole surfaces, and define a series of air gaps therebetween. A magnet is mounted for rotation with the driving shaft for supplying a magnetic flux to a flux path which includes successive, adjacent pairs of pole elements, the rotor, and the air gaps. Rotation of the driving shaft produces rotation of the driven shaft at a speed which is less than that of the driving shaft.

17 Claims, 6 Drawing Figures

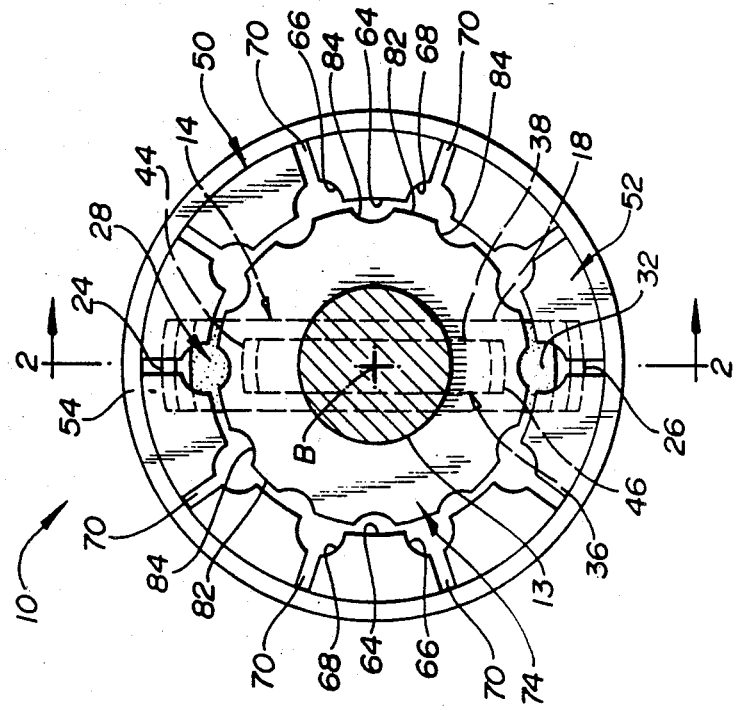

MAGNETIC SPEED REDUCTION DEVICE

BACKGROUND OF THE INVENTION

The present invention relates to a speed reduction device and, more particularly, to a magnetic speed reduction device.

Speed reduction devices are interposed between a driving shaft and a driven shaft to produce a rotational speed of the driven shaft which is less than the rotational speed of the driving shaft. Speed reduction devices are used in a wide variety of applications, such as for example in conjunction with electric motors. A speed reduction device can be coupled between the motor shaft and a driven shaft to effect rotation of the driven shaft at a speed appropriate for a particular application. One type of speed reduction device comprises a gear train which is mechanically coupled between the shaft of the electric motor and the driven shaft.

The foregoing speed reduction devices all require a direct mechanical connection between the motor or engine turning the driving shaft and the driven shaft. In some applications, this moving mechanical connection may be disadvantageous. One such application where a moving mechanical connection is disadvantageous is in fluid or air systems under high pressure, and especially such systems wherein the rotational movement of the motor must be transmitted through a sealing barrier. Typically, a rotating shaft extends through the barrier and seals between the rotating shaft and the barrier prevent leakage. These seals may be subject to stress, and may wear out frequently.

An additional feature of many prior art speed reduction devices is that rotation of the driven shaft produces rotation of the driving shaft at an increased rotational velocity. Such reverse transmission of power may not be desirable in some speed reduction applications, however.

It is seen therefore that a need exists for a speed reduction device which does not require direct mechanical connection between the driving and driven shafts, and which does not affect rotation of the driven shaft in response to rotation of the drive shaft.

SUMMARY OF THE INVENTION

In accordance with the present invention, a magnetic speed reduction device is provided which includes a rotatable driving shaft and a driven shaft which is rotatable about an axis. A stationary pole means is provided which includes a plurality of pole elements, with each pole element having at least one stationary pole surface. The pole elements are circumferentially arranged around the axis. A rotor means is provided which is operatively coupled to the driven shaft for rotation therewith about the axis. The rotor means includes a plurality of circumferentially arranged rotor pole surfaces, the number of which is different than the number of stationary pole surfaces. The rotor pole surfaces are disposed in a spaced, generally opposed relation to the stationary pole surfaces, and define a plurality of air gaps therebetween. Means are also provided which are mounted for rotation with the driving shaft for supplying a magnetic flux to a flux path. The flux path includes successive adjacent pairs of the pole elements, the rotor means and the air gaps therebetween. Rotation of the driving shaft produces rotation of the driven shaft at a speed which is less than that of the driving shaft.

Preferably, the means mounted for rotation includes a first magnetically permeable member having a portion disposed in an opposed relation to the stationary means, a second magnetically permeable member having a portion disposed in an opposed relation to the rotor means, and a magnet means which is disposed between the first and second magnetically permeable members.

Thus, one feature of the present invention is that a speed reduction device is provided wherein the driving shaft is magnetically coupled to the driven shaft. This feature has the advantage of obviating the need for a mechanical coupling, such as a gear train, between the driving shaft and the driven shaft. It is also a feature of the present invention that the magnetic coupling between the driving shaft and the driven shaft provides a one way coupling. This one way coupling permits the driven shaft to be moved independently of the driving shaft.

Additional features and advantages of the present invention will become apparent to those skilled in the art upon consideration of the following detailed description of a preferred embodiment exemplifying the best mode for carrying out the invention as presently perceived.

BRIEF DESCRIPTION OF THE DRAWINGS

FIG. 1 is a front view of the magnetic speed reduction device of the present invention;

FIG. 2 is a sectional view taken generally along lines 2—2 of FIG. 1;

DETAILED DESCRIPTION OF THE PREFERRED EMBODIMENTS

Figure 3:
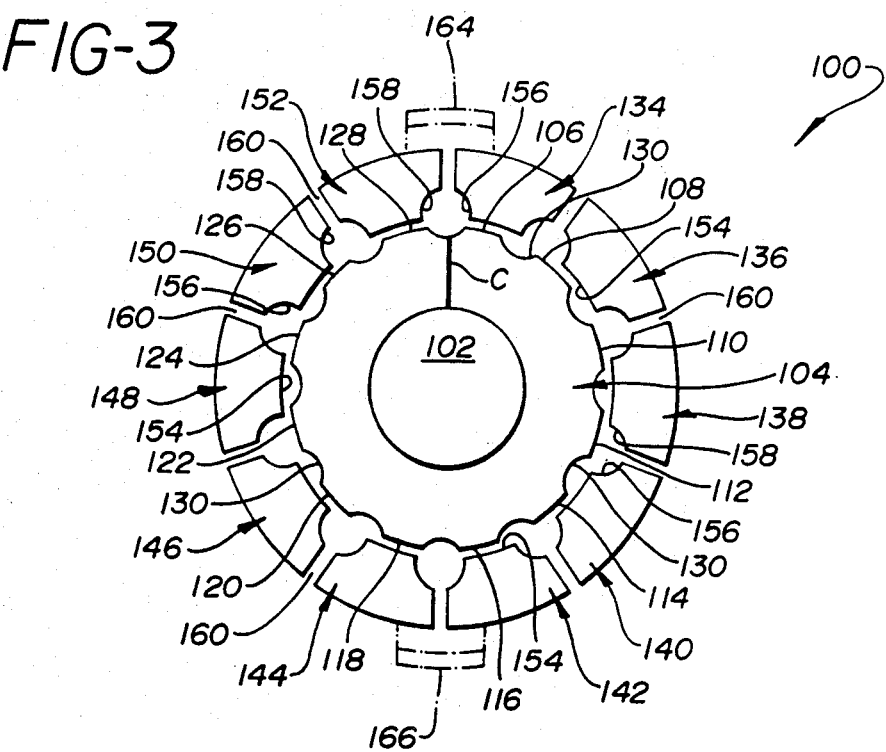
FIG. 3 is a schematic view of the present invention illustrating the operation of the device.

The magnetic speed reduction device 10 of the present invention is shown in FIGS. 1 and 2 as including a driving shaft 12 which is rotatable about an axis A, and a driven shaft 13 which is rotatable about an axis B. In the device 10 shown in the drawings, axes A and B are aligned axes. However, axes A and R need not be precisely aligned.

Driving shaft 12 can be coupled to a motor or other prime mover (not shown) for rotating the driving shaft 12. A first U-shaped bar member 14 is fixed to driving shaft 12 for rotating with the driving shaft 12 about axis A. Preferably, the first bar member 14 is composed of a magnetically permeable material such as iron, steel, or the like. The first bar member 14 includes a radially extending portion 18 having a first axially facing surface 20 and a second axially facing surface 22. The first bar member 14 also includes a first axially extending leg 24 which is disposed at one end of the radially extending portion 18 and a second axially extending leg 26 which is disposed at the other end of the radially extending portion 18.

A magnet means, such as a generally bar-shaped permanent magnet 28, is provided for generating a magnetic flux. The magnet 28 includes a first axially facing surface 30 which is fixed to the second axially facing surface 22 of the first bar member 14 for rotation with the driving shaft 12 about axis A. The magnet 28 also includes a second axially facing surface 32. Magnet 28 is axially polarized, that is polarized in a direction perpendicular to surfaces 30 and 32.

A second U-shaped bar member 36 includes a radially extending portion 38 having a first axially facing surface 40 and a second axially facing surface 42. The second bar member 36 is composed of a magnetically permeable material, and can be made from a material similar to the materials from which first bar member 14 is made. The first axially facing surface 40 of the bar member 36 is fixed to the second axially facing surface 32 of the magnet means 28 for rotation with the magnet means 28, first bar member 14, and driving shaft 12, about axis A.

The second bar member 36 also includes a first axially extending leg 44 which is disposed at one end of the radially extending portion 38 of the second bar member 36, and a second axially extending leg 46 which is disposed at the other end of the radially extending portion 38.

A stationary pole means 50 comprises a plurality (here shown as ten) of discrete pole elements 52 of magnetically permeable material. The discrete pole elements 52 are circumferentially arranged about axis B, and are supported by a collar 54. Collar 54 is preferably composed of a nonmagnetic material so as not to conduct flux between adjacent pole elements 52. Each pole element 52 includes an axially facing surface 56. The axially facing surfaces 56 of the pole elements 52 are disposed in a spaced, opposed relation to the axially facing tips 58, 60 of the respective first and second axially extending legs 24, 26 of the first bar member 14.

The spaces between the tips 58, 60 and the axially facing surfaces 56 of the pole elements 52 form air gaps through which flux is conducted between the first bar member 14 and the stationary pole means 50. Therefore, at any one given instant in time, flux will be conducted only between the tips 58 and 60, and the particular pole elements 52 which are disposed in direct opposition thereto. Each pole element 52 has a radially inwardly facing, generally arcuate stationary pole surface 64 disposed between first and second recessed portions 66, 68. A radially extending slot 70 extends between and separates each set of adjacent pole elements 52.

A disc-shaped rotor 74 of magnetically permeable material is disposed radially inwardly of the stationary pole elements 52. Although rotor 74 is shown as being unitary, it may comprise a plurality of discrete rotor elements, similar to the manner in which stationary pole means 50 comprises a plurality of discrete pole elements 52.

Rotor 74 includes a first axially facing surface 76 which is disposed in a spaced, opposed relation to the tips 78, 80 of the axially extending legs 44, 46 respectively. The spaces between the tips 78, 80 and the first axially facing surface 76 form air gaps through which flux is conducted between the rotor 74 and the second bar member 36.

The radially outwardly facing surface of the rotor 74 includes a plurality (here shown as twelve) of generally arcuate rotor pole surfaces 82 and a plurality (here shown as twelve) of recessed portions 84. It should be noted that the number of rotor pole surfaces 82 is different from the number of stationary pole surfaces 64 of the stationary pole means 50. As will be explained in more detail below, this difference in the number of pole surfaces between the rotor 74 and the stationary pole means 50 contributes significantly to the capacity of the device 10 to function as a speed reduction device.

The spaces between the radially outward facing surfaces 82 of the rotor 74 and the radially inward facing surfaces 64 of the pole elements 52 form air gaps across which flux can pass between the rotor 74 and the stationary pole elements 52. Due to the fact that the pole elements 52 are discrete, and not in magnetic communication, the flux will generally travel only between the rotor 74 and those pole elements 52 which, at a particular given instant in time, are disposed in an opposed relation to the rotating axially extending legs 24, 26 of the first bar member 14. Thus, the circumferential spacing between the radially outer surfaces 82 of the rotor 74 and the radially inner surfaces 64 of the pole elements 52 functions as a series of generally discrete air gaps, with each air gap being formed between the radially inner surface of a particular pole element 52 and that portion of the radially outer surface of rotor 74 adjacent to the particular pole element 52.

The radially interior portion of the rotor 74 is secured to the driven shaft 13 which rotates about axis B. The driven shaft 13 can be coupled to the object or device to be moved.

It will be appreciated that the device 10 can function with the driving shaft 12 and driven shaft 13 placed on opposite sides of a sealing barrier (not shown) without necessitating any breaching of the barrier. The barrier may be placed such that the driving shaft 12, first bar member 14, magnet 28, and second bar member 36 are disposed on one side of the barrier, and the collar 54, stationary pole means 50, rotor 74 and driven shaft 13 are disposed on the other side of the barrier. Alternately, the barrier can be placed in the air gap between the stationary pole surfaces 64 and the rotor pole surfaces 82, such that the driving shaft 12, first bar member 14, magnet 28, second bar member 36, collar 54 and stationary pole means 50 are placed on one side of the barrier and the rotor 74 and driving shaft 13 are placed on the opposite side of the barrier.

The second bar member 36, rotor 74, stationary pole elements 52, first bar member 14, and the air gaps associated with the above listed components define a flux flow path for magnetic flux generated by the magnet 28. The flux flows from one of the poles of magnet 28, through the various magnetic material components and air gaps of the device, to the other of the magnet's poles. As the poles of magnet 28 are located on the respective first and second axially facing surfaces 30, 32 of the magnet, the flux will flow from one axially facing surface through the associated components and ultimately back to the other axially facing surface.

The flux flows from the second axially facing surface 32 of the magnet 28 into the radially extending portion 38 of the second bar member 36, and into both the first and second axially extending legs 44, 46. The flux then flows from the respective tips 78, 80 of the second bar member 36 across an air gap into the rotor 74. As the path of least reluctance to complete the circuit requires that the flux ultimately flow through the axially extending legs 24, 26 of first bar member 14, the flux flows in rotor 74 generally radially outwardly toward those pole elements 52 which, at that particular instant, are disposed in an opposed relation to the tips 58, 60 of axially extending legs 24, 26. In order to flow from the rotor 74 to the pole elements 52, the flux must traverse the air gaps between the rotor pole surfaces 82 and the stationary pole surfaces 64. The flux then flows from pole elements 52 across air gaps into the tips 58, 60 of the axially extending legs 24, 26. The flux then flows through the axially extending legs 24, 26, into the radially extending portion 18 of first bar member 14, and ultimately back to the pole of magnet 28 which is located on the first axially facing surface 30.

The manner in which the rotation of the driving shaft and the flow of flux cooperate to move the driven shaft 13 at a speed less than the driving shaft 12, is best explained with reference to the schematic drawings of FIGS. 3-6. The elements of the speed reduction device 100 have been renumbered in these figures for purposes of clarity in the attendant explanation.

In determining the path through which the flux flows, it is important to remember that a magnetic flux will generally follow the path of least reluctance. As a magnetically permeable material (such as the magnetically permeable material from which the first and second bar members 14, 36, rotor 74 and pole elements 52 are made) presents a path of less reluctance than a path through air, the flux will pass through the magnetically permeable components when possible. In situations wherein the flux must travel across an air gap from the surface of one magnetically permeable component to the surface of another magnetically permeable component, the flux will travel across that air gap which presents the path of least reluctance. As reluctance is generally directly proportional to distance, and inversely proportional to the cross sectional areas of the two surfaces, it follows that the reluctance of an air gap can be decreased if the two surfaces are brought closer to each other (thus reducing the distance between them) or the two surfaces are placed in an overlapping relation, thus increasing the effective cross-sectional area seen by the flux as it flows from one surface to the other.

This desire to decrease distance across an air gap and increase the overlap between the two surfaces defining the air gap is exploited by the present invention.

The magnetic speed reduction device 100, shown schematically in FIGS. 3-6, includes a driven shaft 102 and a rotor 104. Rotor 104 includes twelve rotor pole surfaces which have each been numbered in a clockwise direction as numbers 106-128. A recessed portion 130 is disposed between each of the twelve rotor pole surfaces 106-128. A reference mark line C is drawn on the rotor 104 to illustrate the relative movement of the rotor 104. In FIG. 3, the reference line C is at top dead center.

The rotor 104 is encircled by ten pole elements, numbered in a clockwise direction as even numbers 134-152. Each of the pole elements 134-152 includes a stationary pole surface 154 and first and second recessed portions, 156, 158 respectively. Ten slots, all numbered as 160, are defined between adjacent pole elements 134-152. First leg member 164 is used to illustrate the relative rotative position of the first axially extending leg 24 of the first bar member 14, and second leg member 166 is used to illustrate the relative rotative position of the second axially extending leg 26 of the first bar member 14. As the first and second axially extending legs 44, 46 of the second bar member 36 are in the same rotative position as the first and second axially extending legs 24, 26 of the first bar member 14, it will be appreciated that leg members 164, 166 also illustrate the relative rotative positions of the first and second axially extending legs 44, 46, respectively, of second bar member 36.

For ease of illustration, leg members 164, 166 have been moved radially outwardly of pole elements 134-152 in FIGS. 3-6 . It should be remembered that the actual radial position of the leg members 164, 166 corresponds to the radial position of the axially extending legs 24, 26 of the first bar member 14.

FIG. 3 illustrates the device 100 at the beginning of a cycle, wherein first leg member 164 is at top dead center, and second leg member 166 is at bottom dead center. It should be noted that when first leg member 164 is at top dead center, flux can be transferred between first leg member 164 and a pair of pole elements consisting of pole element 134 and pole element 152. Similarly, when second leg member 166 is at bottom dead center, flux can flow between second leg member 166 and both pole elements 142 and 144.

In order to achieve the lowest reluctance in the path of flux flow between pole elements 134, 152 and rotor pole surfaces 106, 128, the rotor pole surfaces 106, 128 are overlapped completely by the respective stationary pole surfaces 154 of pole elements 134, 152. In this position, the cross-sectional area overlap of the surfaces 106, 128, 154 is maximized. It should also be noted that the recessed portions 156, 158 of pole elements 134, 152 respectively are aligned with the rotor recessed portion 130 between rotor pole surfaces 106, 128. The stationary pole surfaces 154 of rotor pole elements 142, 144 are aligned similarly in a directly overlapping relation with rotor pole surfaces 116, 118.

Figure 4:
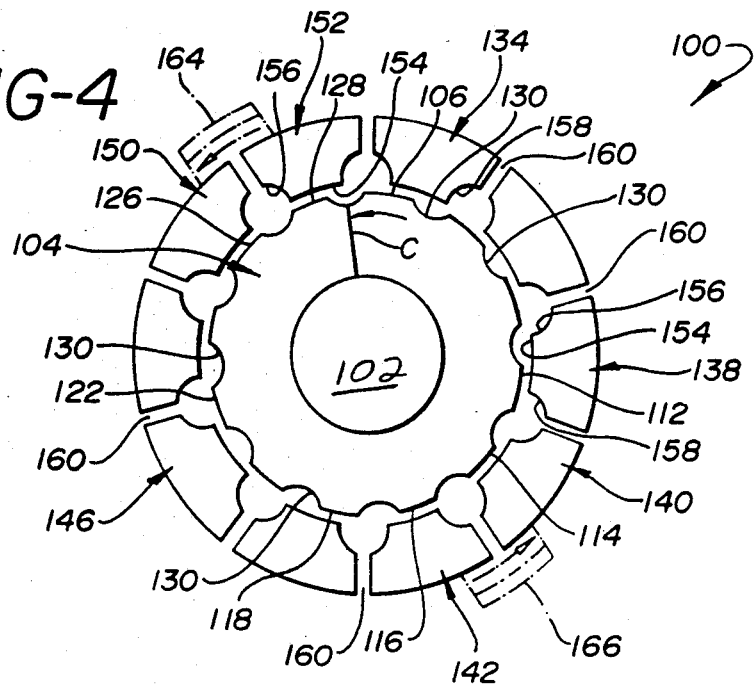
FIG. 4 is a schematic view of the invention.

FIG. 4 illustrates the device 100 wherein the leg members 164, 166 have rotated 36° to a point wherein the leg members 164, 166 bridge pole elements 150, 152 and 140, 142 respectively. As the leg members 164, 166 rotate, the flux path moves to a relatively higher reluctance state, due to the incompleteness of the overlap between rotor pole surfaces 126, 128 and the stationary pole surfaces 154 of pole elements 150, 152 respectively. This incomplete overlap is best illustrated by reference to the relative positions of the rotor pole surfaces 126, 128 and the stationary pole surfaces 154 of pole elements 150, 152 shown in FIG. 3. It will be noticed that rotor pole surface 126 only partially overlaps the stationary pole surface 154 of pole element 150, and that a portion of pole surface 126 overlaps the second recessed portion 158 of pole element 150. In order to achieve a lower reluctance state, the rotor 104 rotates approximately 6° so that there is a complete overlap between rotor pole surface 126 and the pole surface 154 of pole element 150, and a complete overlap between rotor pole surface 128 and the stationary pole surface 154 of pole element 152. As will be appreciated, the above mentioned overlap between the rotor pole surfaces 126, 128 and the respective stationary pole surfaces 154 also results in a complete overlap between the recessed portions 158, 156 of respective stationary pole elements 150, 152 and the recessed portion 130 between rotor pole surfaces 126 and 128.

The relationship between the amount of rotation of the leg members 164, 166 (and hence the driving shaft) and the amount of rotation of the rotor 104 (and hence driven shaft 102) is a function of the number of slots 160 in the stationary pole piece assembly, the number of slots (recessed portions 130) in the rotor 104, and the difference between the number of stationary slots 160 and rotor slots 130. This relationship is expressed by the equation $$V_{DG} = [S_R/(S_R - S_S)] V_{DN}$$

where $V_{DG}$ equals the speed of the driving member, $S_R$ equals the number of slots in the rotor, $S_S$ equals the number of slots in the stationary pole piece assembly, and $V_{DN}$ equals the speed of the driven member.

In the embodiment shown in the drawings, there are 12 slots (recessed portions 130) in the rotor, and 10 slots 160 in the stationary member. Inserting these values into the above equation, one achieves the following:

$$V_{DG} = [12/(12-10)]V_{DN}$$

$$V_{DG}/V_{DN} = 6$$

Thus, for the embodiment shown in the figures, the ratio of speed reduction is 6.0. In other words, the driving shaft moves six times faster than the driven shaft.

It will be appreciated that if the number of stationary pole surfaces were to exceed the number of rotor pole surfaces, the above equation would yield a negative ratio. A negative ratio is indicative of the fact that if the number of stationary pole surfaces exceeds the number of rotor pole surfaces, the driven shaft will rotate, at a reduced speed, in a direction opposite to the direction of rotation of the driving shaft. Thus, if the driving shaft were rotating in a counter-clockwise direction, the driven shaft would rotate in a clockwise direction.

The process described above by which the movement of leg members 164, 166 causes movement of rotor 104 (and hence driven shaft 102), successively moves the rotor 104 as the leg members 164, 166 are moved between successive pairs of stationary pole elements 134-152.

Figure 5:
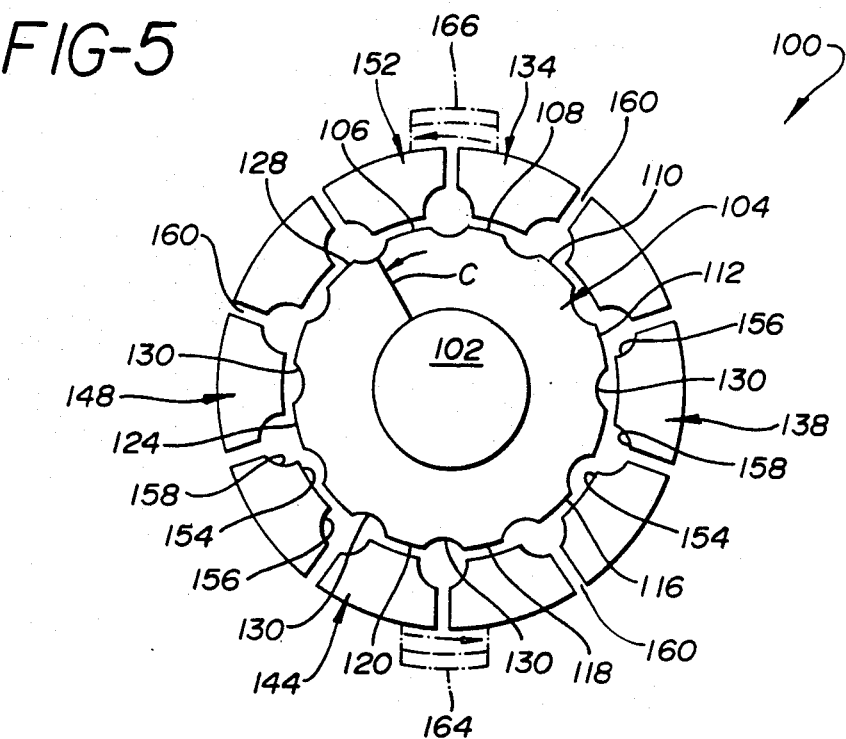
FIG. 5 is a schematic view of the invention.

FIG. 5 illustrates the relative positioning of the rotor 104 after the leg members 164, 166 have moved 180°, so that second leg member 166 is at top dead center, and first leg member 164 is at bottom dead center. The 180° movement of leg members 164, 166 results in the rotor 104 moving 30°, as illustrated by reference mark C.

Figure 6:
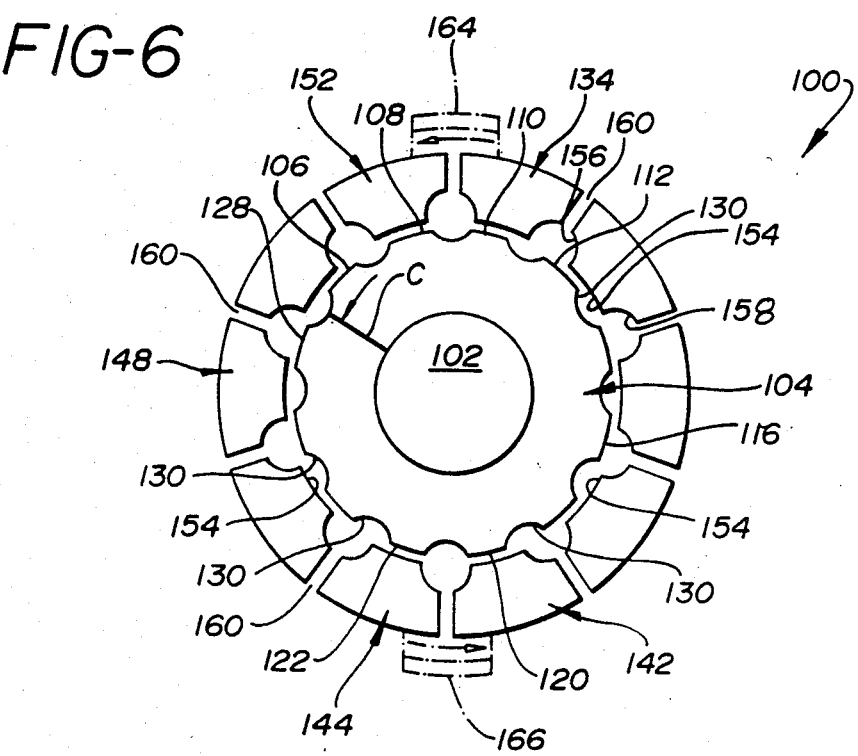
FIG. 6 is a schematic view of the present invention.

FIG. 6 illustrates the end of one complete cycle, wherein the first and second leg members 164, 166 have rotated 360°, with first leg member 164 returning to top dead center and second leg member 166 returning to bottom dead center. Reference mark C illustrates that the 360° rotation of leg members 164, 166 has resulted in a 60° rotation of rotor 104. Although the movement of the rotor 104 has been described above as comprising a series of discrete steps, it will be appreciated that the actual movement of the rotor is continuous.

In the manner described above, it is possible to provide a magnetic speed reduction device wherein the speed of the driven shaft will be reduced by a predetermined ratio of the speed of the driving shaft. It will be appreciated that this device will have numerous applications, since direct mechanical coupling of the driving and driven shafts is not necessitated. Additionally, it will be appreciated that the device of the present invention will transmit power only from the driving shaft to the driven shaft. This may also be desirable in certain applications.

Having described the invention in detail and by reference to preferred embodiments thereof, it will be apparent that modifications and variations are possible without departing from the scope of the invention defined in the appended claims.

What is claimed is:

1. A magnetic speed reduction device comprising:
    (a) a rotatable driving shaft,
    (b) a driven shaft rotatable about an axis,
    (c) stationary pole means including a plurality of pole elements each having at least one stationary pole surface, said pole elements being circumferentially arranged around said axis,
    (d) a rotor means operatively coupled to said driven shaft for rotation therewith about said axis, the rotor means being formed of a magnetically permeable material and including a plurality of circumferentially arranged rotor pole surfaces, the number of which is different from the number of stationary pole surfaces, said rotor pole surfaces being disposed in a spaced, generally opposed relation to said stationary pole surfaces, such that a plurality of air gaps are defined therebetween; and
    (e) means, mounted for rotation with said driving shaft, for supplying a magnetic flux to a flux path which includes successive adjacent pairs of said pole elements, said rotor means and the air gaps between the pole surfaces of said successive adjacent pairs of said pole elements and corresponding successive adjacent pairs of said rotor pole surfaces,
    whereby rotation of said driving shaft produces rotation of said driven shaft at a speed which is less than that of said driving shaft.

2. The magnetic speed reduction device of claim 1 wherein adjacent pole elements are separated by radially extending slots therebetween.

3. The magnetic speed reduction device of claim 1 wherein said pole elements each define a recessed surface disposed adjacent to said stationary pole surface, the recessed surfaces being positioned at a relatively greater distance than said stationary pole surfaces from said rotor pole surfaces, whereby the spacing between adjacent stationary pole surfaces is greater than the spacing between adjacent pole elements.

4. The magnetic speed reduction device of claim 1 wherein said rotor means includes a plurality of rotor recessed surfaces disposed adjacent to said rotor pole surfaces, the rotor recessed surfaces being positioned at a relatively greater distance than the rotor pole surfaces from the stationary pole surfaces.

5. The magnetic speed reduction device of claim 4 wherein said rotor recessed surfaces and rotor pole surfaces are circumferentially arranged in an alternating array around said rotor means.

6. The magnetic speed reduction device of claim 5 wherein said stationary pole surfaces are formed on radially inwardly facing surfaces of said pole elements and said rotor pole surfaces of said rotor means face radially outward, and said rotor means is of unitary construction.

7. The magnetic speed reduction device of claim 1 wherein the stationary pole surfaces and said rotor pole surfaces are separated by air gaps therebetween, and the reluctance of the flux path between a particular stationary pole surface and a particular rotor means pole surface is minimized when the particular stationary pole surface and the particular rotor pole surface are placed in a directly overlapping relation, and in which the rotor pole surfaces and stationary pole surfaces are positioned such that all of the rotor pole surfaces cannot simultaneously be placed in a directly overlapping relation with all of the stationary pole surfaces.

8. The magnetic speed reduction device of claim 7 wherein said means mounted for rotation includes
    a first magnetically permeable member having a portion disposed in an opposed relation to said stationary pole means,
    a second magnetic material member having a portion disposed in an opposed relation to said rotor means, and a magnet means disposed between said first and second magnetically permeable members.

9. The magnetic speed reduction device of claim 8 wherein said magnet means comprises a permanent magnet.

10. The magnetic speed reduction device of claim 1 wherein said means mounted for rotation includes
a first magnetically permeable member having a portion disposed in an opposed relation to said stationary pole means,
a second magnetically permeable member having a portion disposed in an opposed relation to said rotor means, and
a magnet means disposed in said flux path between said first and second magnetic material members.

11. The magnetic speed reduction device of claim 10 wherein said magnet means comprises a permanent magnet.

12. The magnetic speed reduction device of claim 10 wherein
said first magnetically permeable member includes a first and second axially facing surfaces, and is fixed to said driving shaft for rotation therewith,
said magnet means is fixed to said first magnetically permeable member for rotation therewith, and
said second magnetically permeable member includes first and second axially facing surfaces, and is fixed to said magnet means for rotation therewith.

13. The magnetic speed reduction device of claim 12 wherein
said magnet means defines a first magnetic pole located on a first axially facing surface and a second magnetic pole located on a second axially facing surface,
said second axially facing surface of said first magnetically permeable member is disposed adjacent the first axially facing surface of the magnet means, and
said first axially facing surface of said second magnetically permeable member is diposed adjacent the second axially facing surface of the magnet means.

14. The magnetic speed reduction device of claim 10 wherein
said portion of the first magnetically permeable member disposed in an opposed relation to said stationary pole means comprises first and second legs of said first magnetically permeable member, and
said portion of the second magnetically permeable member disposed in an opposed relation to said rotor means comprises first and second legs of said second magnetically permeable member.

15. The invention of claim 1 wherein the rotor pole surfaces and stationary pole surfaces are positioned such that all of the rotor pole surfaces cannot simultaneously be placed in a directly overlapping relation with all of the stationary pole surfaces.

16. The invention of claim 1 wherein said means mounted for rotation includes a permanent magnet.

17. A magnetic speed reduction device comprising:

(a) a driving shaft rotatable about an axis;
(b) a generally U-shaped first bar member including
a radially extending portion having first and second axially facing surfaces and first and second axially extending legs, the first bar member being composed of a magnetically material and being fixed to the driving shaft for rotation therewith about said axis,
(c) a magnet means including
a first axially facing surface on which a first magnetic pole is located, and
a second axially facing surface on which a second magnetic pole is located, the first axially facing surface being in magnetic flux communication with said first bar member, and being fixed to said second axially facing surface of said first bar member for rotation with said first bar member about said axis,
(d) a generally U-shaped second bar member including
a generally radially disposed portion having first and second axially facing surfaces, and first and second axially extending legs disposed radially interiorly of said first and second axially extending legs of said first bar member,
the second bar member being composed of a magnetically permeable material, being in magnetic flux communication with said magnet means and being fixed to said second axially facing surface of said magnet means for rotation with said magnet means about said axis,
(e) a stationary pole means comprising a plurality of stationary pole elements, each pole element including a first axially facing surface disposed in an opposed relation to said first and second axially extending legs of said first bar member; and a radially inwardly facing stationary pole surface,
(f) a disk-shaped rotor means rotatable about said axis, the rotor means including
a first axially facing surface disposed in an opposed relation to said first and second axially extending legs of said second bar member and
a surface having a plurality of radially outwardly facing rotor pole surfaces, the number of said rotor pole surfaces being different from said number of stationary pole surfaces, said rotor pole surfaces of said rotor means and said stationary pole surfaces defining a plurality of air gaps therebetween and
(g) a driven shaft fixed to said rotor means for rotation with said rotor means about said axis,
wherein said second bar member, rotor means, stationary pole means and first bar member define a flux flow path for flux generated by said magnet means, and whereby rotation of said driving shaft produces rotation of said driven shaft at a speed which is less than that of said driving shaft.

* * * * *